US009092026B2

(12) United States Patent
Matsuda et al.

(10) Patent No.: US 9,092,026 B2
(45) Date of Patent: Jul. 28, 2015

(54) REMOTE MONITORING APPARATUS

(75) Inventors: Shigehiko Matsuda, Tokyo (JP); Noriyuki Maehata, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 1294 days.

(21) Appl. No.: 12/944,954

(22) Filed: Nov. 12, 2010

(65) Prior Publication Data
US 2011/0057812 A1 Mar. 10, 2011

Related U.S. Application Data

(63) Continuation of application No. PCT/JP2008/060055, filed on May 30, 2008.

(51) Int. Cl.
*G05B 19/406* (2006.01)
*H04Q 9/00* (2006.01)

(52) U.S. Cl.
CPC ............... *G05B 19/406* (2013.01); *H04Q 9/00* (2013.01); *G05B 2219/33284* (2013.01); *H04Q 2209/40* (2013.01); *H04Q 2209/50* (2013.01)

(58) Field of Classification Search
CPC ...... G07C 5/008; G07C 5/085; G07C 5/0808; B60R 21/0132; B60N 2/0232; G05B 19/406; H04Q 9/00
USPC ........ 340/500–693.12, 870.01–870.44; 701/1
See application file for complete search history.

(56) References Cited

U.S. PATENT DOCUMENTS

| 4,673,832 | A | * | 6/1987 | Murakami et al. | 307/326 |
|---|---|---|---|---|---|
| 5,107,447 | A | * | 4/1992 | Ozawa et al. | 702/58 |
| 5,174,364 | A | * | 12/1992 | Mizuno | 165/301 |
| 5,214,595 | A | * | 5/1993 | Ozawa et al. | 702/58 |
| 5,239,692 | A | * | 8/1993 | Kim | 455/115.1 |
| 5,301,743 | A | * | 4/1994 | Mizuno | 165/270 |
| 5,333,501 | A | * | 8/1994 | Okada et al. | 73/592 |
| 5,333,676 | A | * | 8/1994 | Mizuno | 165/294 |
| 5,550,476 | A | * | 8/1996 | Lau et al. | 324/522 |
| 5,565,783 | A | * | 10/1996 | Lau et al. | 324/522 |
| 5,859,590 | A | * | 1/1999 | Otani | 340/635 |
| 6,100,807 | A | * | 8/2000 | Orr | 340/635 |
| 7,103,460 | B1 | * | 9/2006 | Breed | 701/32.9 |
| 2003/0214307 | A1 | * | 11/2003 | Kang et al. | 324/536 |
| 2005/0192727 | A1 | * | 9/2005 | Shostak et al. | 701/37 |

(Continued)

FOREIGN PATENT DOCUMENTS

| CN | 1514209 | 7/2004 |
|---|---|---|
| CN | 101140461 | 3/2008 |

(Continued)

OTHER PUBLICATIONS

International Search Report from Japanese Patent Office for International Application No. PCT/JP2008/060055, Mailed Jul. 8, 2008.

(Continued)

*Primary Examiner* — Hai Phan
*Assistant Examiner* — Orlando Bousono
(74) *Attorney, Agent, or Firm* — Finnegan, Henderson, Farabow, Garrett & Dunner, LLP

(57) ABSTRACT

Various sensors are provided inside control equipment, and it is determined whether environment inside the control equipment is abnormal or not, based on data obtained from the sensors.

3 Claims, 12 Drawing Sheets

(56) References Cited

U.S. PATENT DOCUMENTS

| | | | |
|---|---|---|---|
| 2005/0273218 A1* | 12/2005 | Breed et al. | 701/2 |
| 2006/0025897 A1* | 2/2006 | Shostak et al. | 701/1 |
| 2006/0180371 A1* | 8/2006 | Breed et al. | 180/197 |
| 2006/0212193 A1* | 9/2006 | Breed | 701/29 |
| 2006/0212194 A1* | 9/2006 | Breed | 701/29 |
| 2006/0284839 A1* | 12/2006 | Breed et al. | 345/156 |
| 2007/0005202 A1* | 1/2007 | Breed | 701/29 |
| 2007/0018837 A1* | 1/2007 | Mizutani et al. | 340/635 |
| 2007/0075919 A1* | 4/2007 | Breed | 345/8 |
| 2007/0205881 A1* | 9/2007 | Breed | 340/447 |
| 2007/0271014 A1* | 11/2007 | Breed | 701/29 |
| 2007/0299587 A1* | 12/2007 | Breed et al. | 701/45 |
| 2008/0042410 A1* | 2/2008 | Breed et al. | 280/735 |
| 2008/0061997 A1* | 3/2008 | Miyashita et al. | 340/646 |
| 2008/0065290 A1* | 3/2008 | Breed et al. | 701/29 |
| 2008/0086240 A1* | 4/2008 | Breed | 701/1 |
| 2008/0114502 A1* | 5/2008 | Breed et al. | 701/2 |
| 2008/0129249 A1* | 6/2008 | Ishishita | 320/136 |
| 2008/0129475 A1* | 6/2008 | Breed et al. | 340/438 |
| 2008/0156406 A1* | 7/2008 | Breed | 152/415 |
| 2008/0216567 A1* | 9/2008 | Breed | 73/146.5 |
| 2008/0284575 A1* | 11/2008 | Breed | 340/438 |
| 2009/0043441 A1* | 2/2009 | Breed | 701/29 |
| 2010/0207754 A1* | 8/2010 | Shostak et al. | 340/450 |
| 2012/0089299 A1* | 4/2012 | Breed | 701/36 |

FOREIGN PATENT DOCUMENTS

| | | |
|---|---|---|
| JP | 4-260938 | 9/1992 |
| JP | 5-40139 | 2/1993 |
| JP | 5-223867 | 9/1993 |
| JP | 6-288853 | 10/1994 |
| JP | 7-234987 | 9/1995 |
| JP | 10-227400 | 8/1998 |
| JP | 2005-128699 | 5/2005 |
| JP | 2006-338460 | 12/2006 |
| JP | 2008-512983 | 4/2008 |
| KR | 101196148 | 10/2012 |

OTHER PUBLICATIONS

Notification of the First Office Action for Application No. 200880129644.3, from the State Intellectual Property Office of People's Republic of China, dated Aug. 30, 2012.

Office Communication for Application No. 1-2010-03189, from the National Office of Intellectual Property of Vietnam, dated Dec. 13, 2013.

First Office Action for Application No. 2010-514312, from the Japanese Patent Office, mailed Mar. 6, 2012.

Notification for Filing Opinion for Application No. 2010-7026908, from the Korean Patent Office, mailed Mar. 20, 2012.

Notification of Reasons for Rejection for Application No. 2012-105942, from the Japanese Patent Office, mailed May 14, 2013.

* cited by examiner

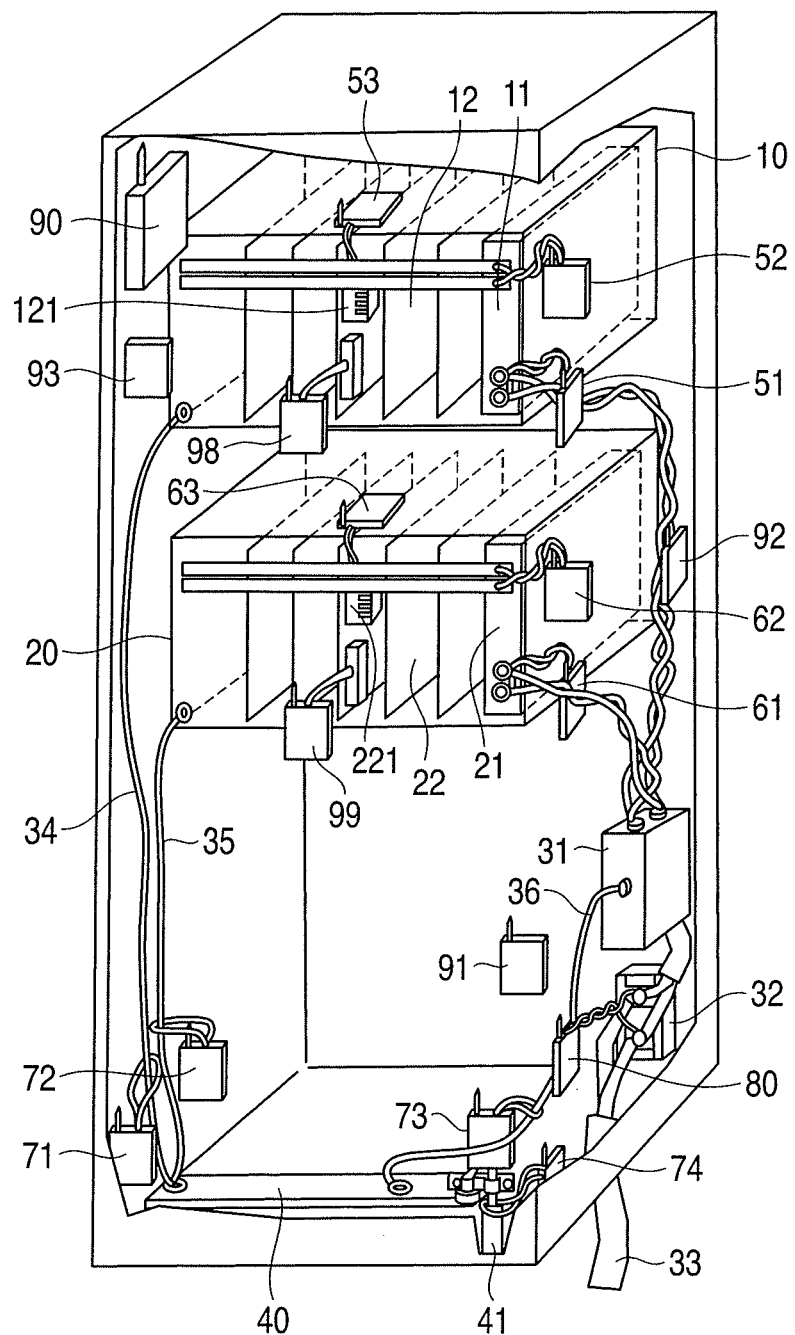
F I G. 5

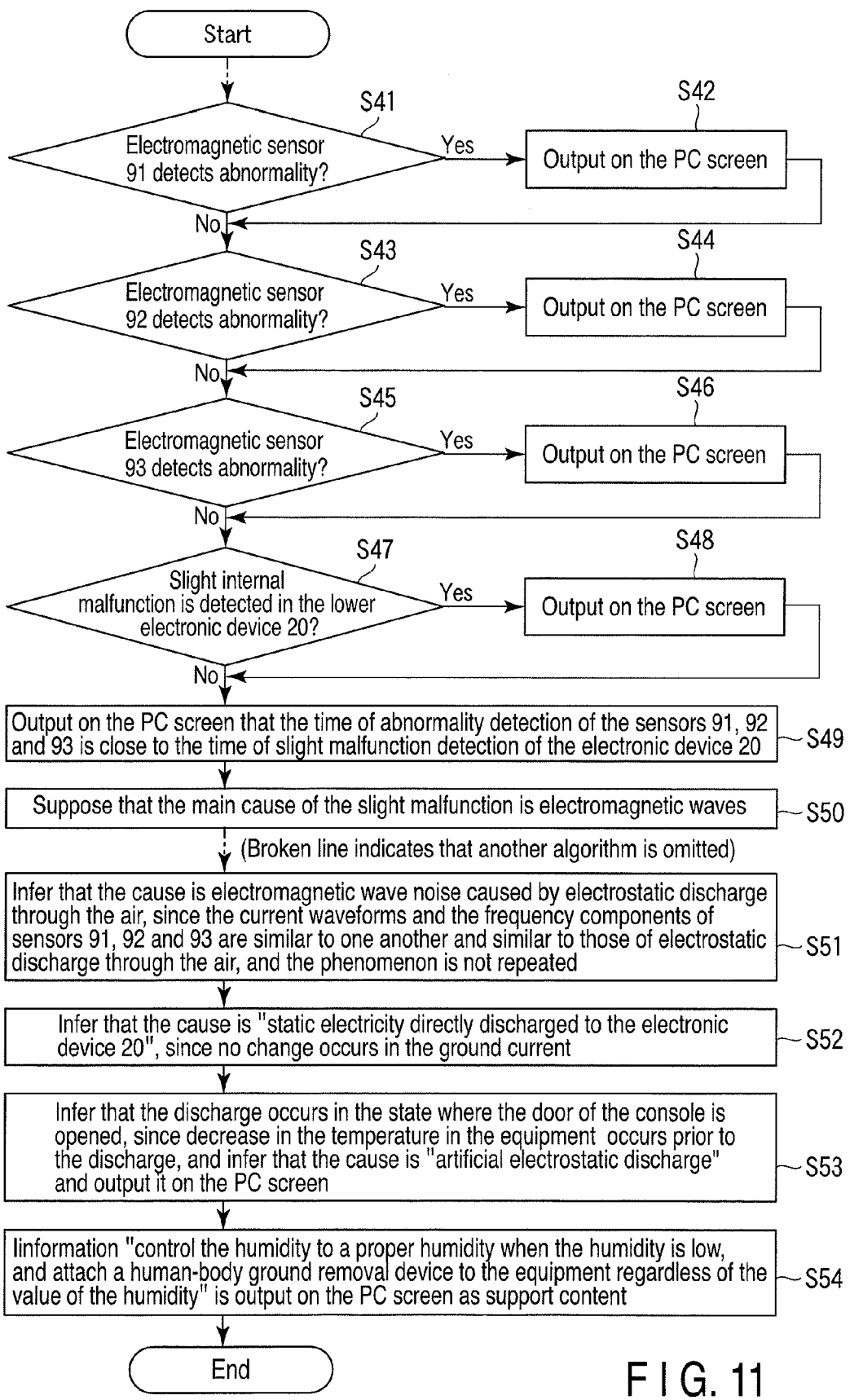
F I G. 11

REMOTE MONITORING APPARATUS

CROSS REFERENCE TO RELATED APPLICATIONS

This is a Continuation Application of PCT Application No. PCT/JP2008/060055, filed May 30, 2008, which was published under PCT Article 21 (2) in Japanese, the entire contents of which are incorporated herein by reference.

BACKGROUND OF THE INVENTION

1. Field of the Invention

The present invention relates to a remote monitoring apparatus which can monitor a placement environment of control equipment as an object to be monitored, such as electronic control equipment for a plant apparatus, at a place remote from it.

2. Description of the Related Art

Generally, sensor systems to be attached to electronic devices include a monitoring system, in which sensors are positioned in advance in places to be measured in a target apparatus or predetermined places for observing whether abnormality occurs, and only determined information is collected. The following Patent Document 1 and Patent Document 2 are examples thereof.

Jpn. Pat. Appln. KOKAI Pub. No. 5-223867 "Electromagnetic Environment Measuring Device" is taken as an example of a monitoring system which has a function of specifying the cause of an abnormality occurring in an electronic control device.

Patent Document 1: Jpn. Pat. Appln. KOKAI Pub. No. 10-227400 "Remote Monitoring System"

Patent Document 2: Jpn. Pat. Appln. KOKAI Pub. No. 5-223867 "Electromagnetic Environment Measuring Device"

BRIEF SUMMARY OF THE INVENTION

Electronic equipment or drive equipment including an electronic control device and an electric motor driving device (hereinafter referred to "equipment") are used for a long time since new introduction thereof. Therefore, generally, the environments around the equipment variously change from the environments when the equipment was established. Such changes in environments may be the cause of malfunctions and abnormalities.

1) A power supply line laid in the vicinity of the control signal line causes noise to the signal line.

2) A motive power line running through the vicinity of the electronic equipment causes noise to the power supply of the electronic control device.

3) An inverter device established in the vicinity of the electronic equipment causes noise to the power supply apparatus and the control signal line.

4) Noise generated by the drive equipment obstructs its control and communication function.

5) A device accompanied with vibration causes malfunctions of devices whose oscillation is limited, and causes bad contact in the signal connecting section.

6) When air conditioning changes, electric discharge caused by static electricity easily occurs in a low humidity state, and directly breaks the electronic control device. In a high temperature state, the timing of the electronic components changes and the electronic components are easily influenced by noise.

When the equipment malfunctions or stops due to such changes in environment, it is difficult to determine whether it is caused by accidental malfunction of parts forming the device, or part malfunction or incorrect operation is caused by the environment where the device is placed. For example, when the electronic control device breaks down due to fluctuations of direct-current power supply voltage used for control, there are many possible causes such as: increase in ripple caused by acceleration in evaporation of an electrolyte of a smoothing capacitor of the power supply apparatus due to high temperature; overlapping of induction noise with the power supply output; superposition of ripple on the DC output side due to mixing of noise into the AC input of the power supply and insufficient grounding of the power supply device; and electromagnetic waves generated by electric discharge in the air by electric charges accumulated due to inferior grounding of the power supply device. In addition, noises include various noises such as an induced current caused by motor operation, noise caused by an inverter, and induction noise caused by a relay and ON/OFF of a switch, and different measures are necessary for different causes.

If it is an abnormal phenomenon which is always observed, it is possible to measure the physical quantity of the environment by attaching a proper probe to an ordinary measuring device such as an oscilloscope, and thereby specify the environment causing the abnormal phenomenon, carry out measures against the environment, and check the effect of the measures. However, for example, there are cases where the frequency of occurrence of an abnormal phenomenon is once a year or less, such as a case where an instantaneous noise caused by operation of an external high-voltage contact affects the equipment while the electronic control device operates.

To appropriately observe such troubles, it is necessary to perform a longtime monitoring, and measure a plurality of causes in a plurality of places which may generate causes.

In addition, with respect to measurement of the environment serving as main causes, it is also necessary to add and change the objects to be measured and the places to be measured.

Besides, even when the electronic control device and the drive device itself have not yet come to an abnormal state, when the control power supply thereof is influenced by external noise or vibration, or there is a sign like "reserve body of occurrence of abnormality" such as the influence gradually increases as time passes, it is necessary to support advance dealing by indicating the sign.

In addition, even when there is a change which is not at a level causing malfunction of the device on the environmental data measured by a sensor, or in the power supply voltage or the ground current of the electronic control device or the drive device itself (hereinafter referred to as "device"), there are cases where the device instantaneously detects abnormality in the bus by I/O access, and returns to a normal state by retry, where a one-bit error occurs in the memory, and the memory recovers by an ECC function, and where a sector abnormality occurs in the disk device due to oscillation and the disk device performs alternative cylinder processing. Although these errors do not cause serious abnormalities to the apparatus, they still cause stress on the apparatus, and may cause malfunctions in the future. It is necessary to support finding such environmental elements which gradually damage the apparatus like body blows, and remove them as soon as they are found.

Besides, when any changes occur on the environmental data, even when no particular abnormality can be found in the control voltage or the ground current of the device measured, the temperature of the electronic board, or the state of the IO bus detected inside, there are cases where influence on the timing in the electronic logical circuit causes instantaneous output inversion or instantaneous malfunction of the buffer IC, which may cause "unexpected control result" in process control. In such cases, it is necessary on maintenance to display information such as change in the environmental data and the control voltage of the device, information of IO bus errors detected inside the device, information of abnormalities of the device itself, and information of time-series information of the process, in a mixed manner, to check they have any relation to the "unexpected control result".

Patent Document 1 discloses a sensor system which measures physical quantities of an object controlled by an ordinary control apparatus, and the sensor system comprises communication means for performing communication between a host CPU and a plurality of monitoring devices each having sensors. This is an invention characterized in that a monitoring device placed in the site performs communication with the host CPU through other monitoring devices. In the invention, a command from the host CPU to a monitoring device is successively transmitted by wireless, and the host CPU monitors and checks data successively transmitted from the monitoring devices, and outputs and displays the data or a result of processing the data on a CRT. The monitoring devices are placed in a number of objects to be monitored, and communications are successively performed in order from the monitoring device closest to the CPU. As an embodiment, Patent Document 1 discloses a monitoring device of a device which monitors a pipeline, and the monitoring device is equipped with ITV and various sensors such as a pressure sensor, a temperature sensor, an vibration sensor, a sound sensor, and a strain gauge.

In this system, each monitoring device is provided with a plurality of sensors, and information obtained from the sensors is transmitted to the host CPU through wireless or wired communications. However, each monitoring device simply transmits physical quantities obtained in the measured place, or transmits processed data obtained by calculating a plurality of physical quantities observed in the place. If the physical quantity obtained in the place is abnormal, the system cannot infer from where the cause of the abnormality is generated. For example, even if the monitoring device has an electromagnetic wave sensor, the monitoring device cannot estimate whether the physical quantity measured by the sensor has any influence on any measurement value of another monitoring device. This is because monitoring devices are arranged along respective specific objects to be monitored. When the object to be monitored is influenced by its environment, there are cases where the cause of the influence is distant from the object. In particular, for example, electromagnetic waves and heat are not positioned along specific objects to be monitored, but have influence on the objects through a certain space. The above system cannot deal with such cases. In addition, the system does not have a mechanism of estimating what influence the environmental data has on the control itself.

Patent Document 2 discloses a sensor system which detects abnormality of an electronic control device, and specifies the cause of the abnormality generated by the environment. Specifically, the sensor system comprises a building storing an electronic control device, and a sensor which measures and specifies electromagnetic interference waves, based on an abnormality detection trigger signal generated by a sensor which detects an abnormality of the electronic control device, on the premise that the abnormality is caused by external electromagnetic interference waves. The sensor system can store electromagnetic interference waves by a trigger, and obtain waveform data thereof such as a waveform, a peak value, a frequency component, the number of waveforms exceeding a preset level. According to the system, it is possible to specify that the electromagnetic interference waves causing abnormality in the electronic control device are generated by, for example, amateur wireless or CD wireless.

However, in the above system, it cannot be specified whether the cause of abnormality is a voltage ripple in the power supply section of the electronic control device, or an induction-noise generating source located in another place of the building. In addition, there are cases where noise in a different building comes through the power supply, and causes the same phenomenon as that caused by interference electromagnetic waves, interference magnetic waves coming through the air or along the signal line cause abnormality to the electronic control apparatus, or the electronic control apparatus comes to be easily influenced by interference electromagnetic waves due to influence by temperature or oscillation. The system cannot specify the above causes, either. This is because the above elements cannot be measured inside the electronic control device. In addition, although Patent Document 2 does not clearly describe it, this is because interference electromagnetic wave measuring devices are large, and cannot be placed inside the electronic control device, as well as the building.

The present invention has been made to solve the above problems. An object of the present invention is to obtain a remote monitoring apparatus which can monitor normality of the control equipment, infer future abnormalities from measurement data of thereof, infer environmental elements which serve as the causes of abnormalities rarely occurring in the equipment, and support measures against the causes.

To achieve the above object, an invention according to claim 1 is a remote monitoring apparatus comprising: a plurality of environment sensors which measure placement environment of devices provided inside control equipment as an object to be monitored, a plurality of physical sensors which measure physical quantities including voltages of the devices provided inside the control equipment as the object to be monitored, and a wireless communication system which is capable of transmitting data measured by the environment sensors and the physical sensors to outside of the control equipment; and a monitoring device comprising another wireless communication system which is provided in a position remote from the control equipment, and is capable of taking in the data measured by the sensors and obtained through the wireless communication system, wherein the monitoring device monitors normality of environment of the control equipment based on correlation between change in the measured data for the placement environment transmitted from the object to be monitored, change in the measured data for the physical quantities transmitted from the object to be monitored, and a pre-stored knowledge base concerning environment standard.

According to the remote monitoring apparatus of the present invention, when abnormality occurs in the control equipment, small sensors which are provided in desired positions inside and outside the board and operate for a long time by batteries measure placement environment information, such as the temperature, the humidity, oscillation, electromagnetic waves inside and outside the board, and the control power supply voltage, the ground current, and the electronic board temperature of the apparatus itself, and the apparatus can infer the main cause of the abnormality, along a prepared inference base, from the above information together with information such as IO bus abnormality, memory abnormality and communication bus abnormality in the apparatus.

In addition, the remote monitoring apparatus of the present invention notifies the user that environmental data should be improved, when the measured environmental data indicates a value close to a threshold value which affects the apparatus, even when no normality occurs in the control equipment. Besides, the remote monitoring apparatus can infer future abnormalities of the device when the measured environmental data deteriorates as years pass by, and can also infer future abnormalities of the apparatus when environmental data which affects the life of the device are continuously observed.

In addition, according to the remote monitoring apparatus, it is possible to obtain a function of supposing that an "unexpected control result" on control occurs when the electronic device of the control equipment is performing any process control. In such a case, even when there is no abnormality of the device or the measured value, such as the control power supply voltage of the device, is not abnormal, or there is no abnormality in the IO bus and the memory inside the device or communication of the device, the remote monitoring apparatus displays information of environment abnormality in combination with control data of process control. Thereby, the remote monitoring apparatus allows the user to estimate whether instantaneous logical inversion in the electronic logical circuit or instantaneous malfunction of the memory which is not monitored has occurred due to change in the environment inside or outside the equipment.

BRIEF DESCRIPTION OF THE SEVERAL VIEWS OF THE DRAWING

FIG. 5 is a diagram illustrating a schematic structure of plant control equipment which is a second example of the object monitored by the apparatus of FIG. 1;

FIG. 11 is an algorithm diagram for supporting a measure in Embodiment 6 of the remote monitoring apparatus of the present invention.

DETAILED DESCRIPTION OF THE INVENTION

Figure 1:
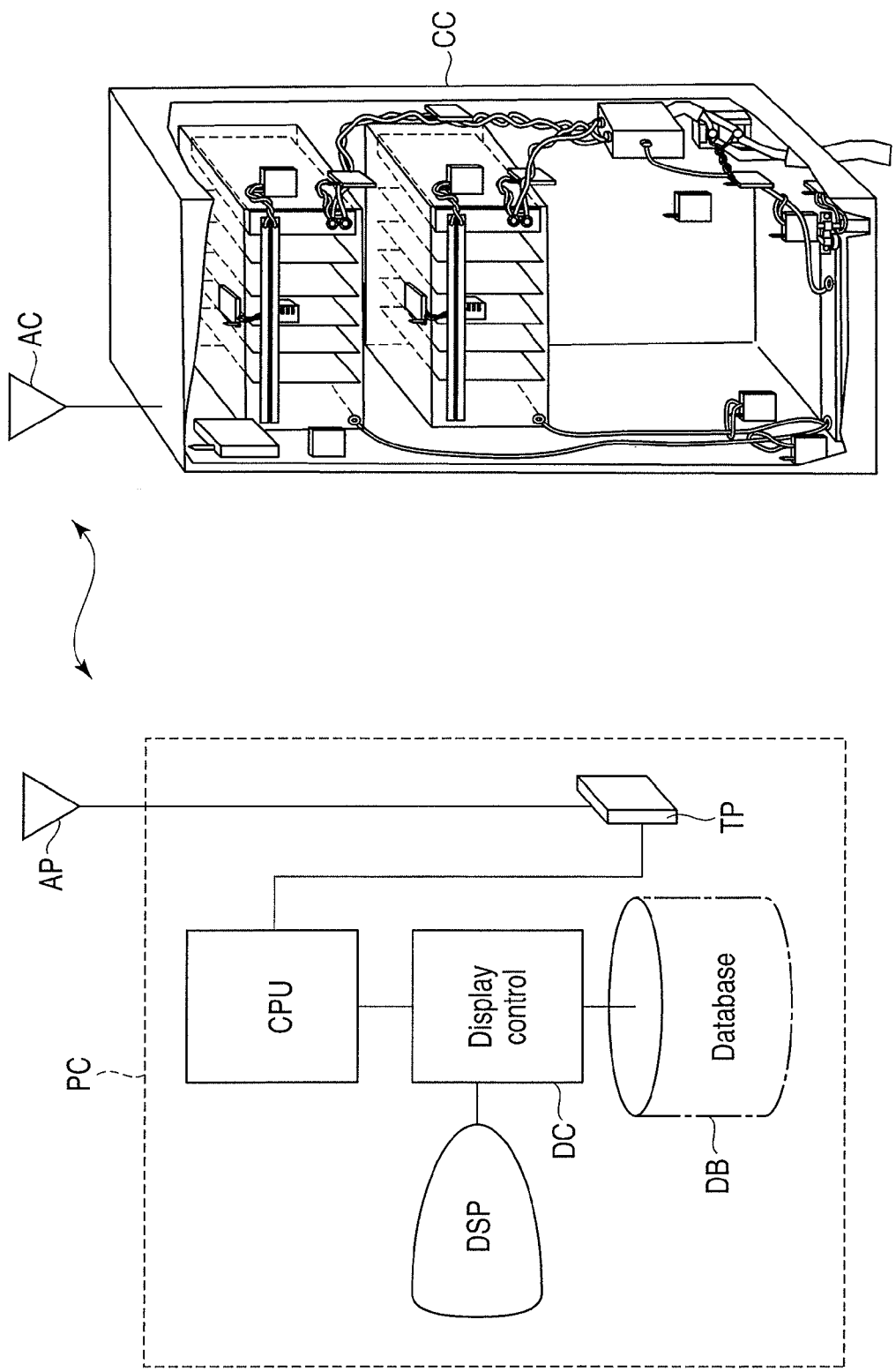
FIG. 1 is a diagram illustrating a schematic structure of a remote monitoring apparatus of the present invention.

Embodiments of a remote monitoring apparatus of the present invention will now be explained below with reference to drawings. FIG. 1 is a diagram illustrating a schematic structure of the remote monitoring apparatus, which includes plant apparatus control equipment (hereinafter simply referred to as "equipment") CC being an object to be monitored, and a monitoring apparatus, for example, a computer system PC that is arranged remote from the equipment CC, takes in environmental information and physical information of the equipment CC by wireless communication, and monitors the equipment CC. The computer system PC comprises control means CPU, display control means DC, a database DB in which a knowledge base is stored, and display means DSP.

The knowledge base is obtained by, for example, preparing a plurality of typical electronic equipment, performing experiments by providing environmental noise to the equipment, and expressing the result of experiments numerically, and determining the degree of influence thereof on the environment, on the basis of values of the result of the experiments which agree with a result of simulation. For example, in the case of electromagnetic waves, the possible sources of electromagnetic waves are induction devices such as motors, power supply devices such as inverters, discharge through the air such as static electricity, turning on/off of induction devices such as relays, and devices using electric waves, and electromagnetic waves generated therefrom have different characteristics in the current waveform, the frequency component, and presence/absence of repetitive elements. On the other hand, when such electromagnetic waves affect the apparatus, possible routes of the electromagnetic waves are a power supply line, a ground line, input/output signal lines, a route through the air and combinations thereof. In transmission through the air, absorption and reflection by the shape of the equipment vary according to the frequency band. In addition, in the case where minute but accumulative damages are caused to electronic devices by long-time continuous environmental abnormalities, the conditions and the periods of the environmental abnormalities causing damages are different. Besides the basic causes, examples of causes of abnormalities of the electronic control device are insufficiency of capacity of the noise filter, malfunction of the noise filter, insufficiency in capacity of the ground line of the noise filter, bad connection of the ground line, erroneous grounding in the shield of the signal line, and insufficiency of shielding of the apparatus itself against electromagnetic waves transmitted through the air. The database DB is provided with such knowledge as knowledge base. The realizing method of the knowledge base can be any method, such as an independent logic group, an independent inference engine, and direct execution on algorithm.

EMBODIMENT 1

Embodiment 1 is explained below with reference to FIGS. 1 to 4.

Figure 2:
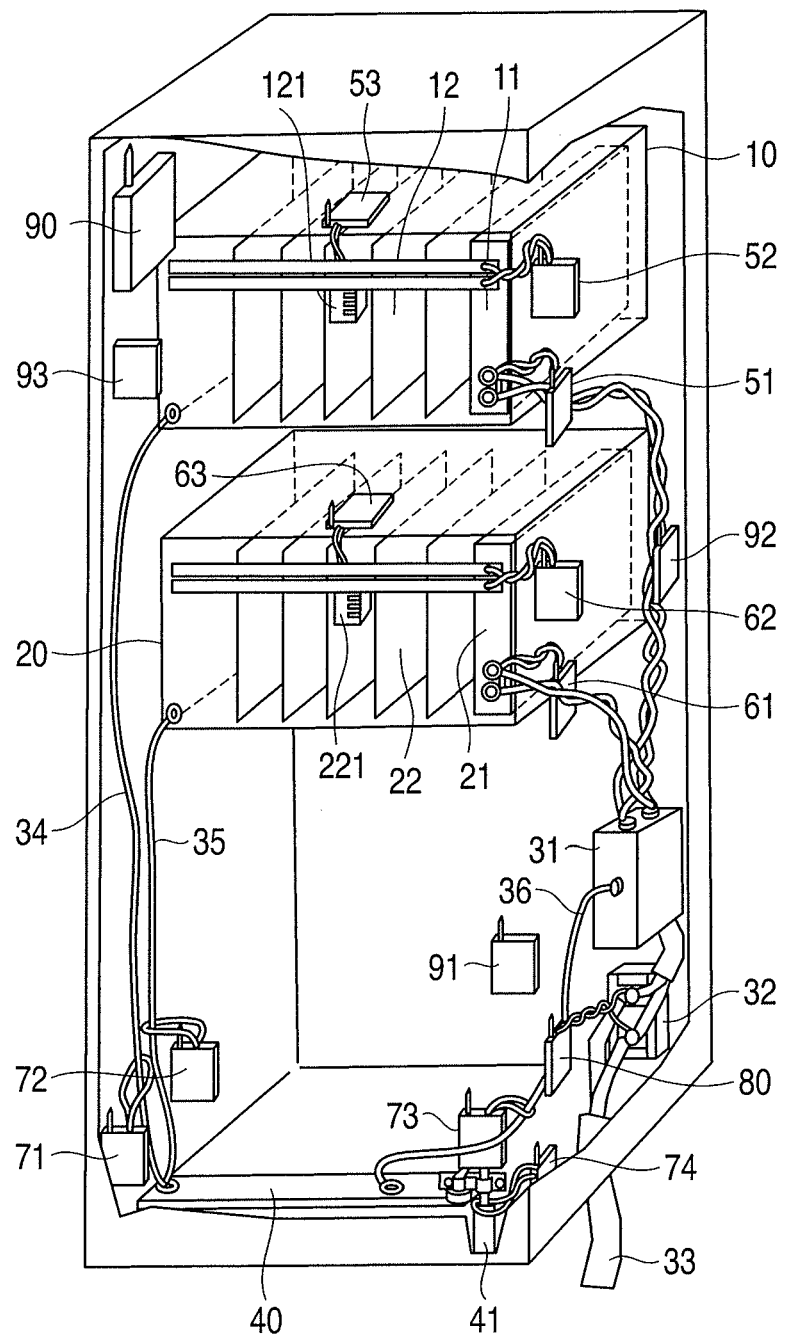
FIG. 2 is a diagram illustrating a schematic structure of plant control equipment which is an example of an object to be monitored by the apparatus of FIG. 1.

FIG. 2 illustrates a structure in the electronic board and an example of arrangement of a plurality of sensors in the electronic equipment in a transmission form. Reference numeral 10 denotes an electronic control device, reference numeral 11 denotes an AC power supply device (hereinafter referred to as "power supply device"), reference numeral 12 denotes an electronic board, and reference numeral 121 denotes a component arranged on an electronic board 12 and having radiating fins.

Reference numeral 20 denotes another electronic control device, reference numeral 21 denotes an AC power supply device (hereinafter referred to as "power supply device") in the electronic control device 20, reference numeral 22 denotes an electronic board in the electronic control device 20, and reference numeral 221 denotes a component arranged on an electronic board 22 and having radiating fins.

Reference numeral 31 denotes a noise filter, 32 denotes an electricity-receiving section, 33 denotes an AC cable, 34 denotes a ground line of the electronic control device 10, 35 denotes a ground line of the electronic control device 20, 36 denotes a ground line of the noise filter, 40 denotes a ground bar, and 41 denotes a ground line.

Reference numeral 51 denotes an AC voltage sensor which measures an AC current of an AC electricity-receiving terminal of the AC power supply device 11, 52 denotes a control power supply voltage sensor which measures a control power supply voltage being the output voltage of the power supply device 21, and 53 denotes a temperature sensor which measures a surface temperature of the component 121 on the electronic board 12.

Reference numeral 61 denotes a voltage sensor which measures an AC current electricity-receiving terminal of the power supply device 21, 62 denotes a voltage sensor which measures a control power supply voltage being the output voltage of the power supply device 21, and 63 is a temperature sensor which measures a surface temperature of the component 221 on the electronic board 22.

Reference numeral 71 is a ground current sensor which measures a ground current of the electronic control device 10, 72 denotes a ground current sensor which measures a ground current of the electronic control device 20, 73 denotes a noise filter ground current sensor, which measures a ground current of the noise filter, and 74 denotes a ground line ground current sensor which measures a ground current of the ground line. Reference numeral 80 denotes a voltage sensor which measures a voltage of an electricity-receiving AC input in the electricity-receiving section.

Reference numeral 90 denotes a wireless relay also serving as a temperature/humidity/oscillation/acceleration sensor (hereinafter referred to as "wireless relay sensor"), which is disposed in the electronic equipment, collects data of other sensors by wireless, measures the temperature in the equipment, the humidity in the equipment, oscillation, and acceleration at a point representative of the electronic equipment, and transmits the measured data together with the data of the other sensors to the outside of the equipment. The wireless relay sensor 90 is a sensor attached to a wireless relay which performs data collection at intervals of 1 second to 1 minute. The other sensors measure data at cycles of several nanoseconds to several μ seconds, and have a function of collecting data for a certain time when the measured value exceeds thresholds of a plurality of set levels or set conditions are satisfied.

Figure 3:
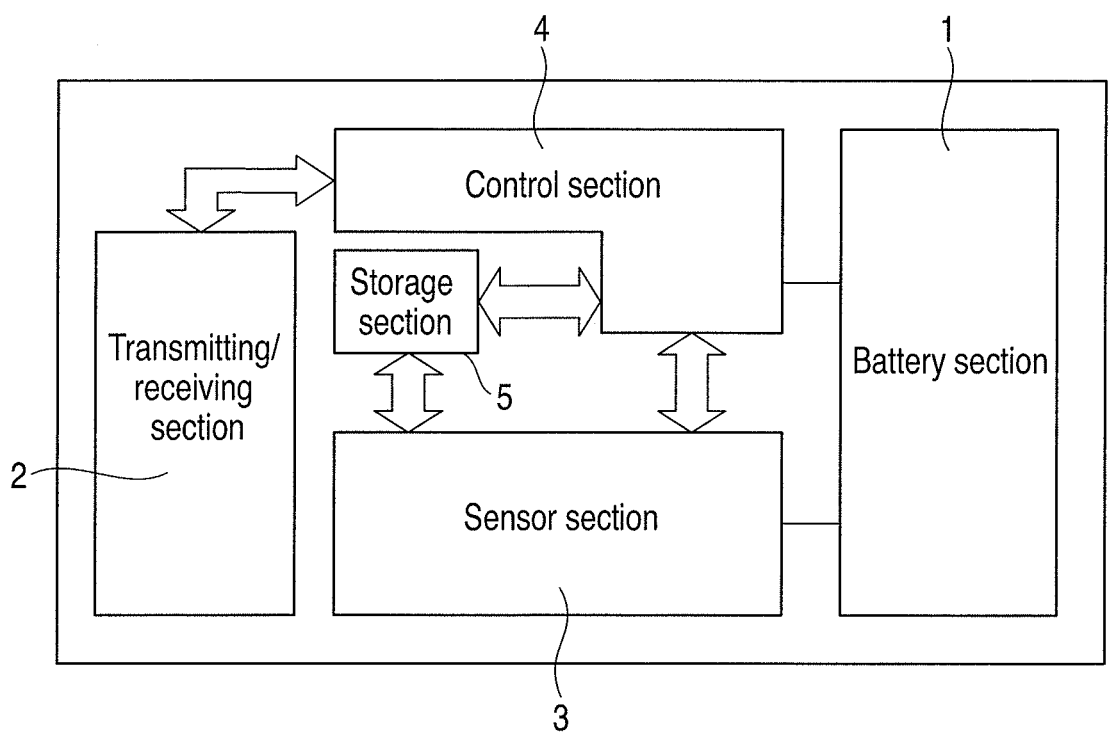
FIG. 3 is a block diagram illustrating an example of a sensor of FIG. 1.

As illustrated in FIG. 3, each of the sensors 51 to 53, 61 to 63, 71 to 74, 80 and 90 to 93 has a battery section 1, a transmitting/receiving section 2 including a wireless circuit and an antenna, a sensor section 3, a control section 4, and a storage section 5. The control section 4 inputs data from the sensor section 3 at provided cycles or events, stores the data in the storage section 5, and transmits the data from the sensor section 3 together with the measuring time. On the assumption that transmission ends in failure due to the environment in the equipment, data can be stored for a predetermined time, and each sensor has a function of retrying transmission. The relay sensor 90 and the other sensors perform the same operation.

The sensors preferably have a size which can be disposed, for example, between the electronic control device and the electronic control device. In addition, to prevent the sensor itself from being influenced by electromagnetic wave factors, the power supply of each sensor preferably does not include any power supply line, and each sensor preferably can perform measurement for a long time by batteries. Beside the above points, the sensors preferably have the following functions.

1) Each sensor data collected is transmitted to the outside by wireless, without a signal line influenced by electromagnetic wave noise.

2) A plurality of sensors can be disposed in desired positions on a surface of the electronic equipment, according to the measurement object and structure of the electronic equipment.

3) Data obtained by these sensors can be taken out of the equipment without opening the door thereof, to prevent change in temperature, humidity, or oscillation.

4) A probe or the like attached to each sensor is shortened as much as possible to obtain accurate data.

5) For the cases where sensor data cannot be transmitted due to abnormalities of the environment, sensor data is stored inside the sensor for a predetermined time, and can be retransmitted after the transmission function is recovered.

Figure 4:
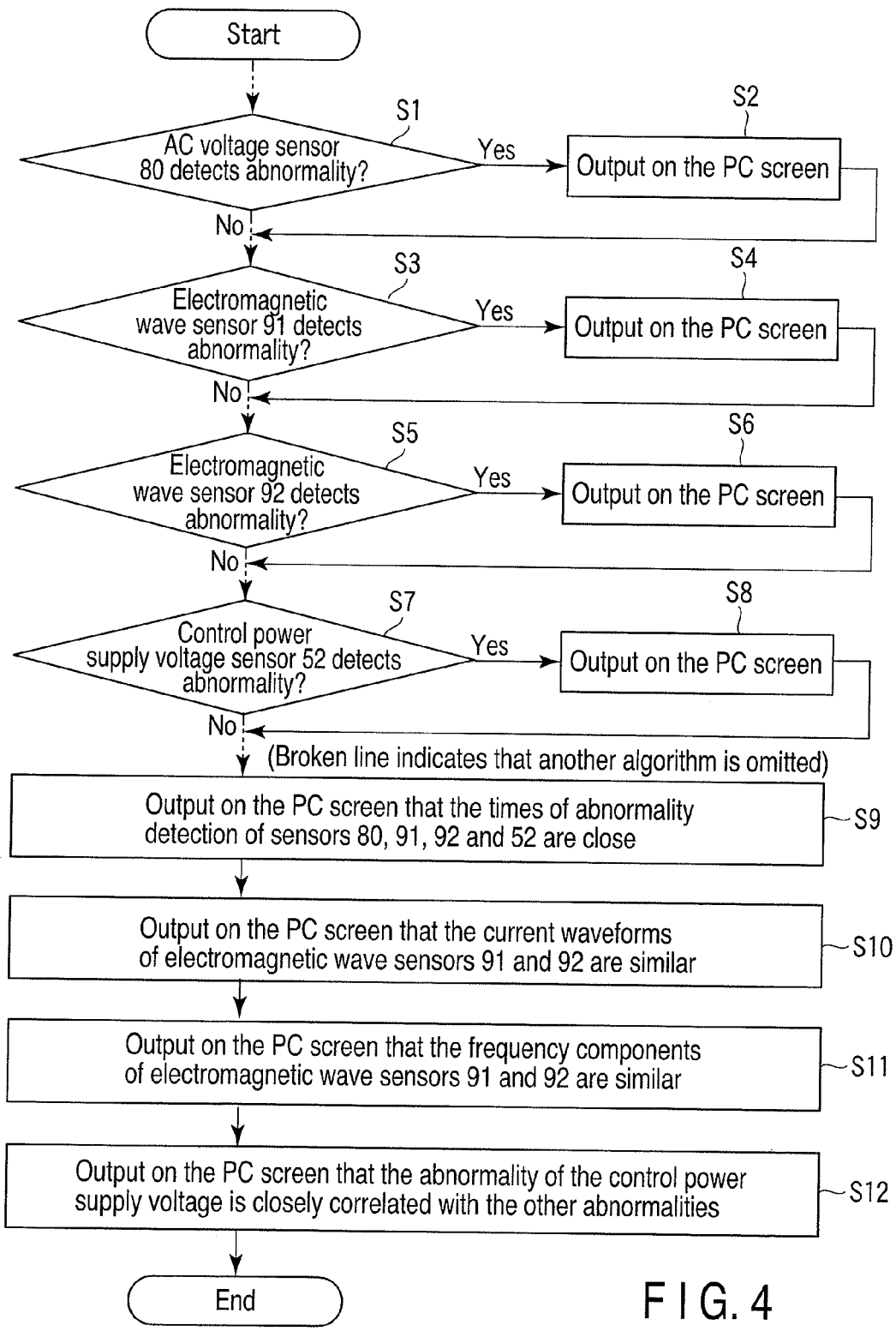
FIG. 4 is an algorithm diagram for determining normality of an equipment environment of Embodiment 1 of the remote monitoring apparatus of the present invention.

FIG. 4 illustrates an example of an inference-based algorithm which infers the part which causes abnormality on the basis of data collected through the wireless relay.

Operation of the remote monitoring apparatus is explained below, supposing that electromagnetic wave noise of a motor driving inverter power supply device (not shown) which is placed in the vicinity of, or inside, the equipment enters the equipment through the AC power supply input, and causes abnormality of the power supply voltage of the electronic control device.

When an electromagnetic wave noise is mixed into the AC power supply, the AC voltage sensor 80 detects it, and transmits a detection result to the wireless relay sensor 90. In addition, the electromagnetic wave sensor 91 located in the vicinity of the electricity-receiving section transmits detected current data to the wireless relay sensor 90.

The noise mixed into the AC power supply is attenuated by the noise filter 31, and the current passes through the ground line 36 and the ground bar 40, and runs into the ground line 41. The voltage sensors 51 and 61 on the output side of the noise filter do not sense the noise as a threshold value at a level of abnormality, since the noise in the AC power supply line is attenuated.

The noise mixed through the AC electricity-receiving section runs through the air, and overlaps the output of the power supply device 11. Thereby, the voltage sensor 52 of the output section of the power supply device 11 detects an abnormal voltage, and transmits data of the abnormal voltage to the wireless relay sensor 90. Simultaneously, the electromagnetic sensor 92 located in the vicinity of the electronic control device 10 transmits a current waveform detected at abnormal level to the wireless relay sensor 90.

The sensors other than the sensors 80, 52, 90, 91 and 92 transmit data, which indicates that nothing particular is detected at an abnormality level but the device is affected, to the wireless relay sensor 90. The wireless relay sensor 90 transmits data of the temperature, humidity, and oscillation in the equipment to the PC of FIG. 1 which executes the inference flow of FIG. 4, and transmits the data exceeding the abnormality level from the voltage sensors 80 and 52, and data detected by each of the other sensors and including a value exceeding the threshold value.

The PC infers the part including abnormality, by the following process illustrated in the flowchart of FIG. 4.

Abnormality of the AC power supply is detected by abnormality data detected by the voltage sensor 80 in the AC electricity-receiving section (S1), and is output on the PC screen (S2).

Abnormality due to electromagnetic wave noise is detected based on a current value of the electromagnetic wave sensor 91 located in the vicinity of the AC electricity-receiving section (S3), and is output on the PC screen (S4).

Abnormality due to electromagnetic wave noise is detected based on a current value of the electromagnetic wave sensor 92 located in the vicinity of the electronic control device 20 (S5), and is output on the PC screen (S6).

Abnormality of the power supply is detected based on a voltage value of the voltage sensor 52 in the output section of the power supply control device of the electronic control device 10 (S7), and is output on the PC screen (S8).

The PC screen displays that a plurality of abnormality detection phenomena which damage the normality of the electronic equipment occur at close times by S1, S3, S5 and S7 (S9), and that waveforms of the currents of the two electromagnetic wave sensors 91 and 92 are similar to each other (S10). Then, it is output on the PC screen that the frequency components of the two electromagnetic wave sensors 91 and 92 are similar to each other (S11). Thereafter, it is output on the PC screen that the abnormality of the control power supply voltage is closely correlated with the other abnormalities (mutually related phenomena) (S12).

Embodiment 1 described above has the effect that the relation between the equipment environment which affects the devices in the equipment and abnormality of the apparatus can be clearly indicated.

EMBODIMENT 2

Embodiment 2 is explained below with reference to FIGS. 5 and 6.

FIG. 5 illustrates a structure which is the same as that of FIG. 2, except that transmitting sections 98 and 99 which output internal information of the electronic control devices 10 and 20, respectively, are provided. The same constituent elements as those in FIG. 2 are denoted by the same respective constituent elements, and explanations thereof are omitted. FIG. 6 is an example of algorithm executed when the normality of the electronic equipment or the electronic control devices is estimated and supported, by correlating change in environment with abnormalities of low level detected inside, on the basis of data collected through the wireless relay, including internal information of the electronic control devices.

Next, operation of the remote monitoring apparatus of Embodiment 2 is explained below.

When electromagnetic wave noise is mixed into the AC power supply, the voltage sensor 80 of the AC power supply detects abnormality (S1), transmits a detection result to the wireless relay sensor 90 and outputs a detection result on the PC screen (S2). In addition, the electromagnetic wave sensor 91 located in the vicinity of the electricity-receiving section detects abnormality (S3), transmits a detection result to the wireless relay sensor 90 and outputs the detection result on the PC screen (S4). The noise mixed in the AC power supply is attenuated by the noise filter 31, and the current thereof passes through the ground line 36, and runs into the ground line 41 through the ground bar 40.

The voltage sensors 51 and 61 on the output side of the noise filter do not sense respective voltage values as threshold values at abnormal level, since the noise in the AC power supply line is attenuated. The noise mixed through the AC electricity-receiving section overlaps the output of the power supply device 11 through the air. Thereby, the control power supply voltage sensor 52 in the output section of the power supply device 11 detects change in voltage at a level which is not abnormal, and data thereof is transmitted to the wireless relay sensor 90.

Simultaneously, the electromagnetic wave sensor 92 located in the vicinity of the electronic control device 10 transmits a current waveform detected at a level which is not abnormal to the wireless relay sensor 90.

The electronic control devices 10 and 20 transmit information of slight malfunction of the memory, slight malfunction of the IC bus, and slight malfunction of the disk, from the transmitting sections 98 and 99, respectively, to the wireless relay sensor 90 at predetermined cycles.

The sensors other than the voltage sensors 80 and 52, the wireless relay sensor 90, and the electromagnetic wave sensors 91 and 92 also transmit data, which indicates that nothing particular is detected at abnormal level but the device is affected, to the wireless relay sensor 90. The wireless relay sensor 90 the data from the transmitting sections 98 and 99, together with data of the temperature, humidity and oscillation in the equipment, to the PC (not shown) which executes the inference flow of FIG. 6. In addition, the wireless relay sensor 90 also transmits the data at level not abnormal from the voltage sensors 80 and 52, and data detected by each of the other sensors and exceeding its threshold value, to the PC.

Figure 6:
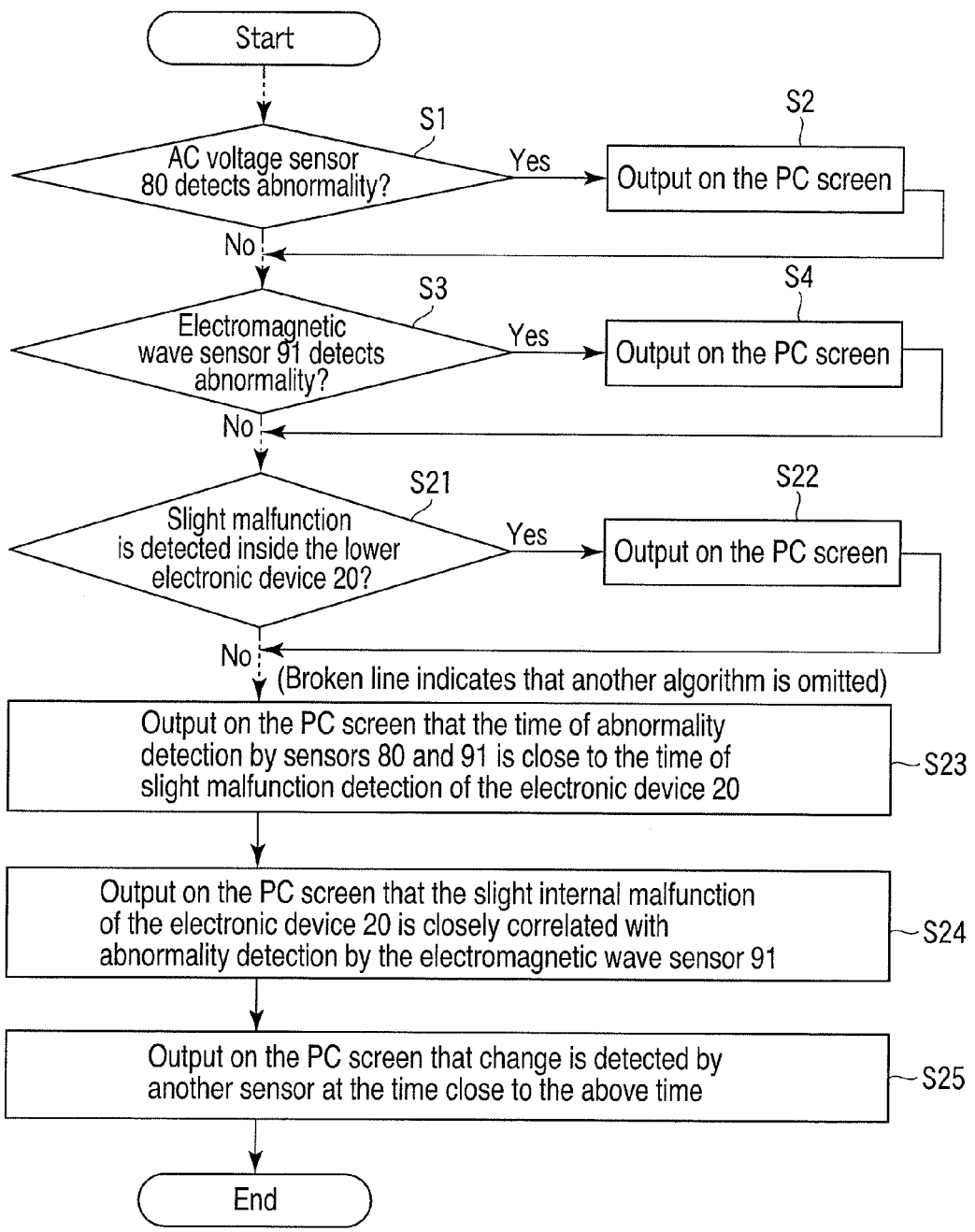
FIG. 6 is an algorithm diagram for determining normality of an equipment environment of Embodiment 2 of the remote monitoring apparatus of the present invention.

The PC infers the part including abnormality, by the example of algorithm illustrated in FIG. 6.

Abnormality of the AC power supply is detected by abnormality data detected by the voltage sensor 80 in the AC electricity-receiving section (S1), and is output on the PC screen (S2).

Abnormality due to electromagnetic wave noise is detected based on a current value of the electromagnetic wave sensor 91 in the vicinity of the AC electricity-receiving section (S3), and is output on the PC screen (S4).

A slight malfunction is detected inside the lower electronic control device 20 based on the status inside the electronic control device 20 (S21), and is output on the PC screen (S22). In this case, it is output on the PC screen that the time when the sensors 80 and 91 detected abnormality is close to the time when the slight internal malfunction was detected inside the electronic control device 20 at step S21 (S23). Then, it is output on the PC screen that the slight internal malfunction of the electronic control device 20 is closely correlated with the abnormality detected by the electromagnetic wave sensor 91 (S24). Then, it is also output for each detection on the PC screen that another sensor detects change at the time close to the above time (S25).

As described above, the PC screen displays information of S23 to S25. The PC screen also displays that the phenomena which damage the normality of the electronic equipment are related to a slight malfunction phenomenon occurring in the electronic device since the times of S1, S3 and S21 are close to one another, the noise detected by the electromagnetic wave sensor 92 is not at abnormal level but has a waveform and a frequency component similar to those detected by the electromagnetic wave sensor 91, and the other sensors detect any change although it is not abnormality. In comparison with Embodiment 1, Embodiment 2 has the effect of clarifying that noise in the device causes any influence in the apparatus although it does not cause clear malfunction of the device.

A knowledge base (not shown) determines a combination of elements to be checked whether there is correlation between the elements, and determines simultaneousness of phenomena. The knowledge base can be realized by any method, such as an independent logic group, an independent inference engine, and direct expression on algorithm.

EMBODIMENT 3

Embodiment 3 is explained below with reference to FIGS. 5 to 7.

Figure 7:
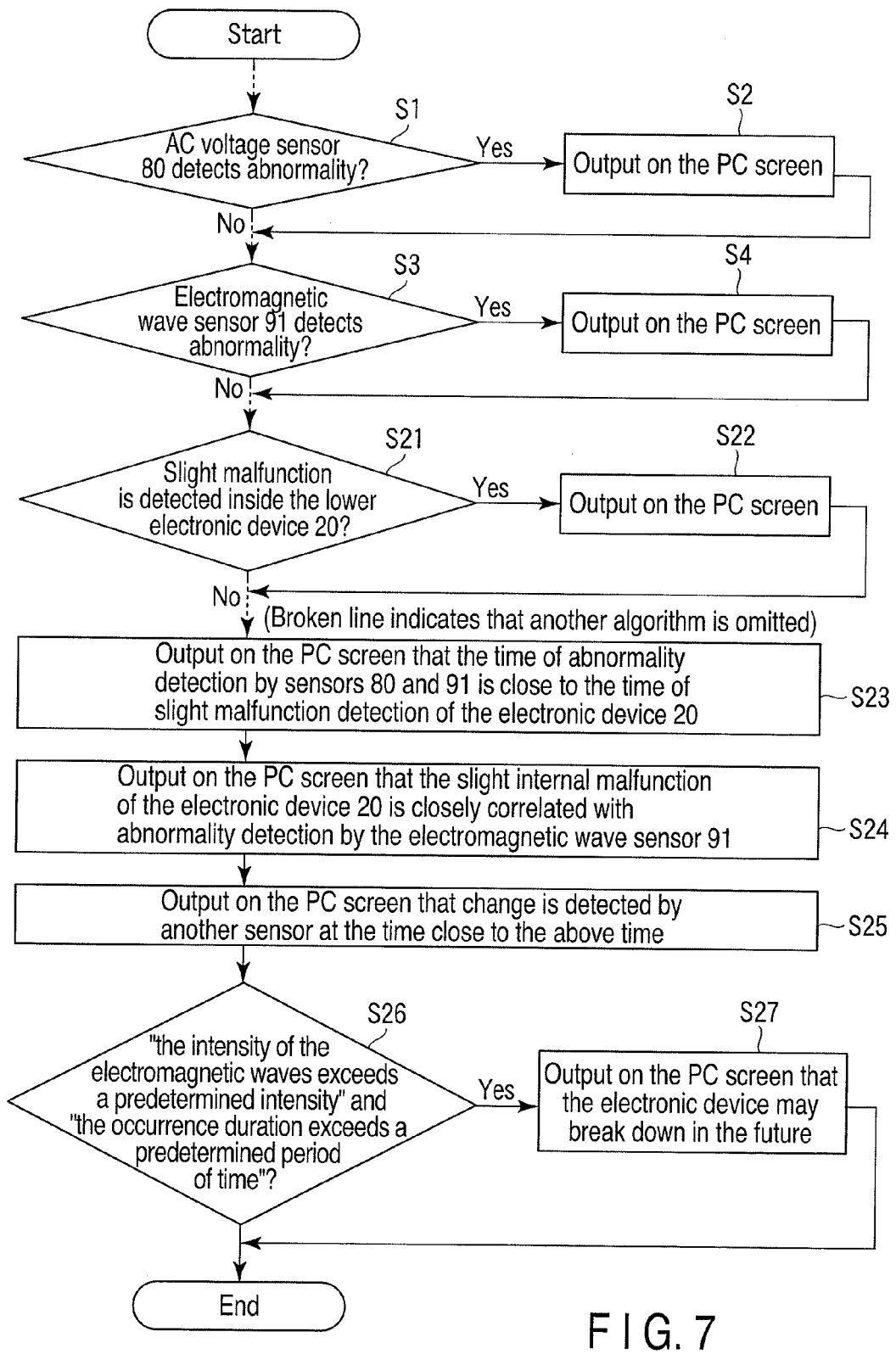
FIG. 7 is an algorithm diagram for determining an influence of the equipment environment with a lapse of years in Embodiment 3 of the remote monitoring apparatus of the present invention.

FIG. 7 illustrates an example of algorithm which infers a future abnormality and malfunction of the electronic equipment itself with lapse of time, by determining continuous occurrence of the above state, in addition to the algorithm of FIG. 6. The steps of FIG. 7 having the reference numerals shown in FIG. 6 are the same as the steps of FIG. 6.

Next, operation of the remote monitoring apparatus is explained. In Embodiment 3, mixing of electromagnetic wave noise into the AC power supply, detection operation in the electronic equipment, and transmission operation from the relay to the PC are the same as those in Embodiment 2. In Embodiment 2, when the voltage sensor detects abnormality (S1), the electromagnetic wave sensor 91 detects abnormality (S2), and the internal malfunction detecting sensor detects a slight malfunction inside the electronic device 20 (S3), the sensors 80 and 91 output on the PC screen that the times of abnormality detection are close to the time of detection of the slight malfunction inside the electronic device 20 (S23). Then, it is output on the PC screen that the slight internal malfunction of the electronic control device 20 is closely correlated with the abnormality detected by the electromagnetic wave sensor 91 (S24). In addition, the other sensors placed inside the control equipment other than the electromagnetic sensor 91, the voltage sensor 80 and the internal malfunction detecting sensor detect change at the time close to the time when the abnormality was detected (S25). The process up to the above is the same as Embodiment 2 of FIG. 6. Thereafter, it is determined whether "the intensity of the electromagnetic waves exceeds a predetermined intensity" and "the occurrence duration exceeds a predetermined period of time" (S26). When the above conditions are satisfied, it is output on the PC screen that the electronic device 20 may break down in the future (S27).

A knowledge base (not shown) determines a combination of elements to be checked whether there is correlation between the elements, simultaneousness of phenomena, factors concerning future malfunctions, and the duration being the condition for determination. The knowledge base can be realized by any method, such as an independent logic group, an independent inference engine, and direct expression on algorithm.

In addition, the operations of the sensors are the same as those in Embodiment 1.

Embodiment 3 described above has the effect that it is possible to warn of long-term influence of electromagnetic waves on the electronic devices, when there is change in environment which does not directly affect on the electronic devices but is repeated.

EMBODIMENT 4

Embodiment 4 is explained below with reference to FIGS. 2 and 8.

Explanation of FIG. 2 is the same as that in Embodiment 1, and is omitted here.

Next, operation of Embodiment 4 is explained, on the assumption that electromagnetic noise of a motor-driving inverter power supply device (not shown) placed in the vicinity of, or inside, the equipment is mixed into the equipment through the AC power supply input, and the power supply of the electronic control device generates an abnormal output due to ground malfunction of the line filter caused by the noise.

When electromagnetic noise is mixed into the AC power supply, the voltage sensor 80 of the AC power supply detects the noise, and transmits a detection result to the wireless relay sensor 90. In addition, the electromagnetic wave sensor 91 located in the vicinity of the electricity-receiving section transmits detected current data to the wireless relay sensor 90.

In this case, although the noise mixed into the AC power supply passes through the noise filter 31, suppose that there is bad contact between the ground line 36 and the ground bar 40, and the noise current does not run into the ground line 41 through the ground bar 40. Since the noise in the AC power supply line is not attenuated, the voltage sensors 51 and 61 on the output side of the noise filter 31 sense the noise as threshold value at abnormal level, and transmit information thereof to the wireless relay sensor 90. In addition, the voltage sensors 52 and 62 in the output section of the power supply devices 11 and 21 detect the noise mixed through the AC electricity-receiving section as abnormal voltage, and transmit data thereof to the wireless relay sensor 90. Simultaneously, the electromagnetic wave sensors 92 and 93 located in the vicinity of the electronic control devices 10 and 20, respectively, transmit respective current waveforms detected at abnormal level to the wireless relay sensor 90.

Although the ground current sensor 73 of the noise filter senses nothing in this state, the ground current sensors 71 and 72 of the power supply device of the electronic control device 20 detect a noise current caused by a filtering action of the power supply, and transmit information thereof to the wireless relay sensor 90.

The other electromagnetic wave sensors 92 and 93 also transmit any respective information items to the wireless relay sensor 90.

The wireless relay sensor 90 transmits data of the temperature, humidity and oscillation in the equipment to a PC (not shown) which executes the inference flow of FIG. 4, and transmits data detected by the respective sensors and exceeding respective threshold values to the PC.

Figure 8:
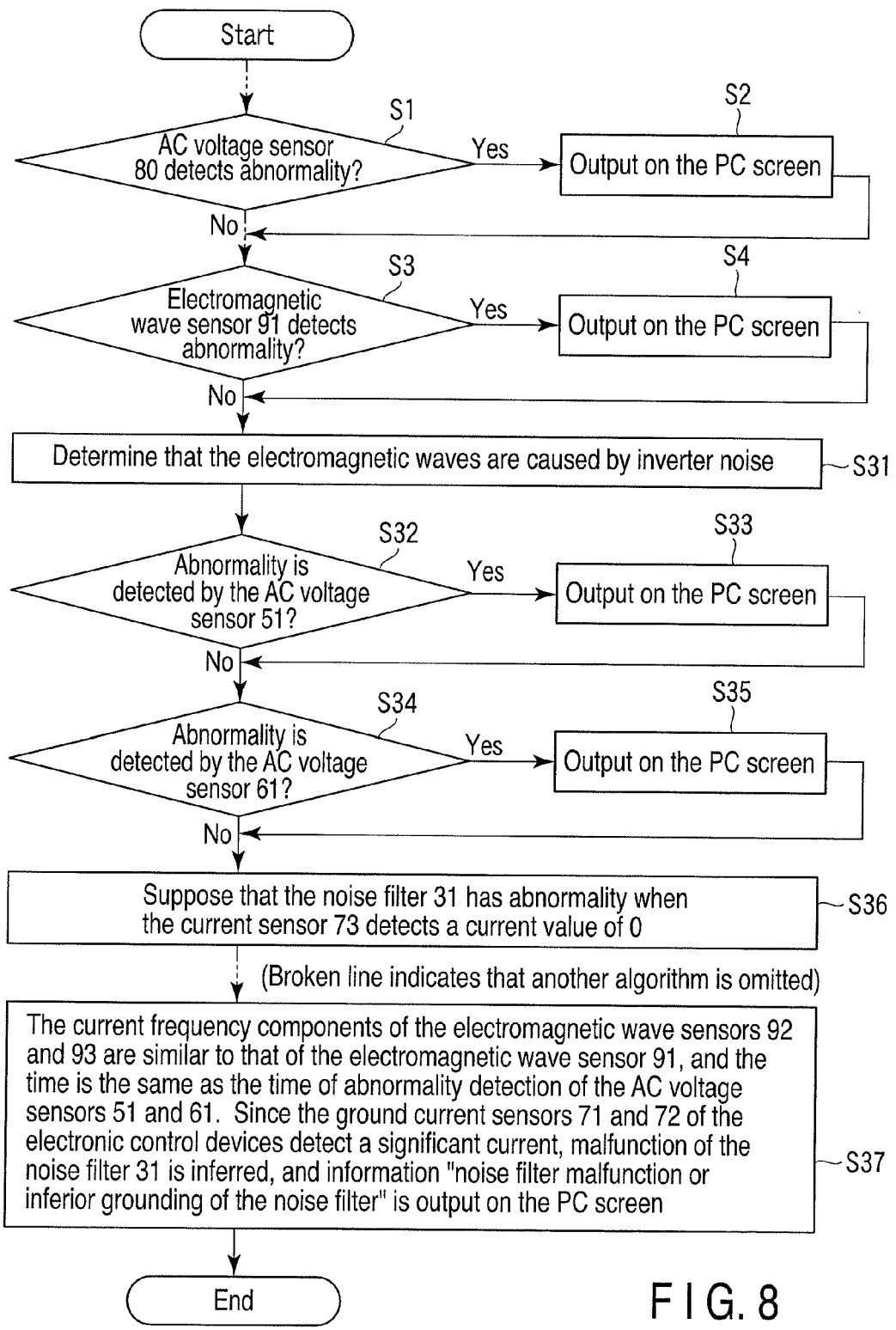
FIG. 8 is an algorithm diagram for inferring the cause of abnormality when abnormality of the equipment occurs in Embodiment 4 of the remote monitoring apparatus of the present invention.

The PC infers the part including abnormality by the example of algorithm illustrated in FIG. 8.

Abnormality of the AC power supply is detected by abnormality data detected by the voltage sensor 80 in the AC electricity-receiving section (S1), and is output on the PC screen (S2).

Abnormality due to electromagnetic wave noise is detected based on a current value of the electromagnetic wave sensor 91 in the vicinity of the AC electricity-receiving section (S3), and is output on the PC screen (S4). Simultaneously, it is determined that inverter noise enters on the basis of a frequency component of the current sensed by the electromagnetic sensor 91 (S31).

Then, it is checked whether AC voltage sensor 51 detects abnormality of the AC voltage of the power supply of the electronic control device 10 (S32), and whether the AC voltage sensor 61 detects abnormality of the AC voltage of the power supply of the electronic control device 20 (S34). When the sensors 51 and 61 detect no abnormality and no noise filter ground current runs, it is supposed that the noise filter has abnormality (S36). When abnormality is detected at step S32 and/or step S34, results of detections are displayed on the PC screen (S33 and S35).

Then, it is checked whether the current frequency components of the electromagnetic sensors 92 and 93 located in the vicinity of the electronic control devices 10 and 20 are similar to that of the electromagnetic wave sensor 91, whether the time of detection of the electromagnetic wave sensors 92 and 93 are the same as the electromagnetic wave sensor 91, whether the time of detection of the electromagnetic wave sensors 92 and 93 are the same as the time of abnormality detection of the AC voltage sensors 51 and 61 of the control power supply, and whether the ground current sensors 71 and 72 of the electronic control devices 10 and 20 detect a significant current. Since the above conditions are satisfied, it is inferred that "electromagnetic noise caused by the inverter has entered through the AC electricity-receiving section, and the noise has caused the ground malfunction of the noise filter 31 and thereby affected inputs of the power supplies of the electronic control devices 10 and 20", and it is inferred that the part which caused malfunction is "noise filter 31" or "noise filter ground", and a result of inference and the ground for the inference are output on the PC screen (S37).

A knowledge base (not shown) determines a combination of elements to be checked whether there is correlation between the elements, simultaneousness of phenomena, inference of the cause and the part including malfunction. The knowledge base can be realized by any method, such as an independent logic group, an independent inference engine, and direct expression on algorithm.

In addition, the operations of the sensors are the same as those in Embodiment 1.

According to Embodiment 4, it is possible to determine the circumstances in the board and the devices based on comprehensive information, and infer the cause or the part including the cause.

EMBODIMENT 5

Embodiment 5 is explained below with reference to FIGS. 5 and 9.

Explanation of FIG. 5 is the same as that in Embodiment 2, and is omitted here.

Next, operation of Embodiment 5 is explained, based on an example of the case where a person (not shown) approaches the devices in the equipment, and electric charges accumulated in the body of the person are discharged to the electronic devices through the air.

When the person opens the door of the equipment, the wireless relay sensor 90 detects change in the temperature in the equipment, and transmits a detection result to a PC (not shown).

The electric discharge from the person through the air is detected as abnormality by the electromagnetic sensors 91, 92 and 93 (S41, S43 and S45), and detection results thereof are transmitted and output on a PC screen (not shown) through the wireless relay sensor 90 (S42, S44 and S46).

The lower electronic control device 20 detects a slight malfunction of the memory and a slight malfunction of the IO bus to transmit them from the transmitting section 99 to the wireless relay sensor 90 at predetermined cycles (S47) to output information of slight malfunction of the disk on the PC screen (S48). The other sensors do not detect any particularly abnormal values or any changes.

Figure 9:
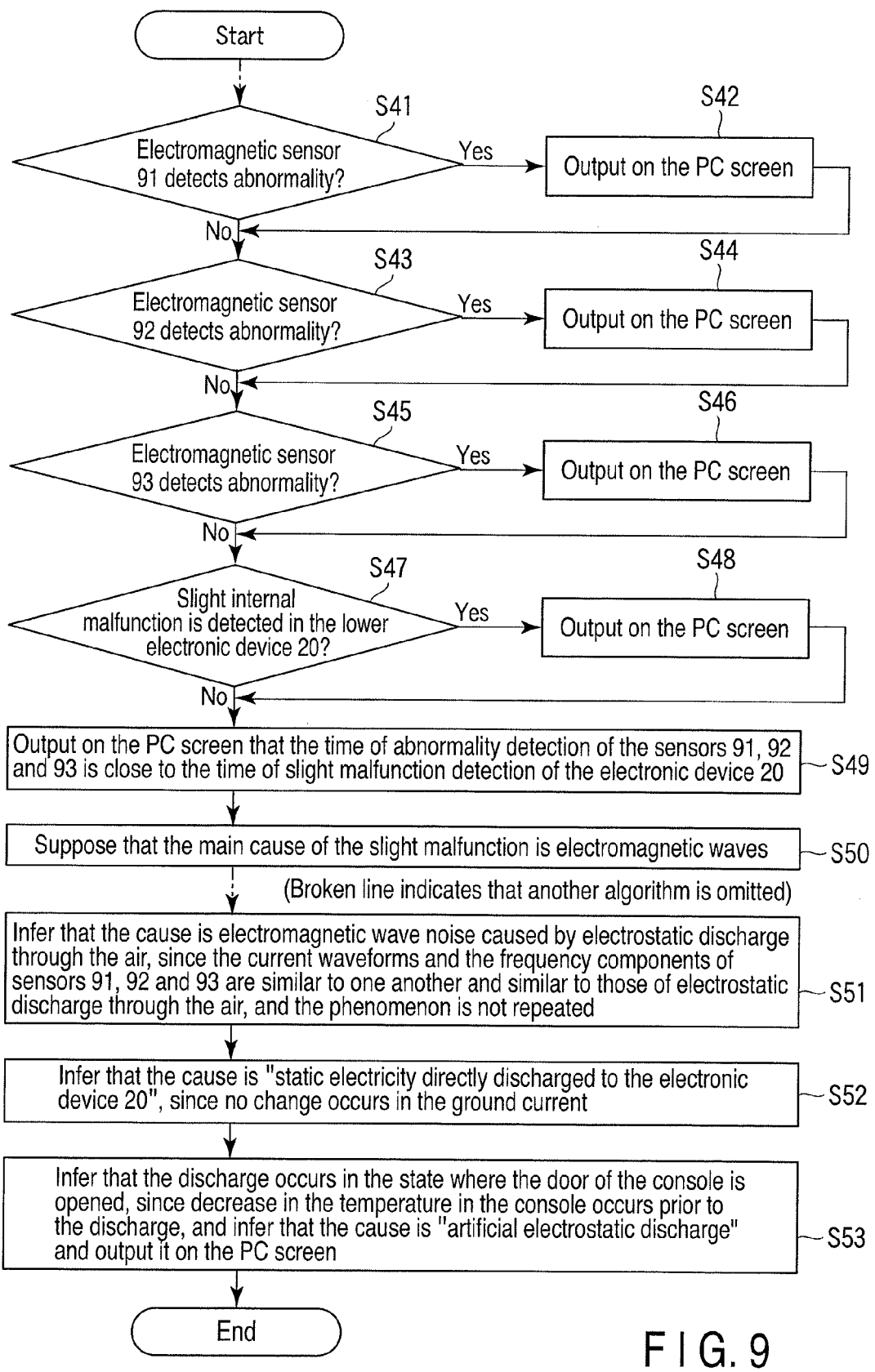
FIG. 9 is an algorithm diagram for inferring the cause of abnormality when abnormality of the equipment occurs in Embodiment 5 of the remote monitoring apparatus of the present invention.

The PC infers the part including abnormality by an example of algorithm illustrated in FIG. 9.

The electromagnetic wave sensors 91, 92 and 93 detect electromagnetic wave noise at the same time (S41, S43 and S45), and detection results are output on the PC screen (S42, S44 and S46).

In addition, it is output by the transmitting section 99 and displayed on the PC screen that the time of abnormality detection by the electromagnetic wave sensors 91, 92 and 93 is close to the time of slight malfunction detection of the electronic device 20, and thereby the slight malfunction in the electronic device 20 is probably caused by electromagnetic waves (S49). In addition, it is supposed that the main cause of the slight malfunction in the electronic device 20 is electromagnetic waves (S50).

Since the current waveforms and the frequency components obtained by the electromagnetic wave sensors 91, 92 and 93 are similar to one another and similar to those of electrostatic discharge through the air, and this phenomenon is not repeated, it is inferred that the cause is electromagnetic wave noise generated by electrostatic discharge through the air (S51). Since there is no change in the ground current or the like, it is inferred that the static electricity is "static electricity directly discharged to the electronic device 20" (S52).

Since there is decrease in temperature in the equipment prior to the time of detections of the electromagnetic wave sensors 91, 92 and 93, it is inferred that the door of the equipment is opened. Then, it is inferred that "artificial electrostatic discharge" occurs, and a result of the inference and the ground for the inference are output on the PC screen (S53).

A knowledge base (not shown) determines a combination of elements to be checked whether there is correlation between the elements, simultaneousness of phenomena, inference of the cause and the part including malfunction. The knowledge base can be realized by any method, such as an independent logic group, an independent inference engine, and direct expression on algorithm.

In addition, the operations of the sensors are the same as those in Embodiment 1.

Embodiment 5 described above has the effect that it can be clarified that noise has any influence on the inside of the device, although the noise does not cause clear malfunction to the device.

EMBODIMENT 6

Accompanying Embodiments 4 and 5, Embodiment 6 is explained below with reference to inference algorithms illustrated in FIGS. 10 and 11. Occurrence of abnormalities, operations of the sensors, and operation of communications are the same as those in Embodiment 4 or Embodiment 5.

Figure 10:
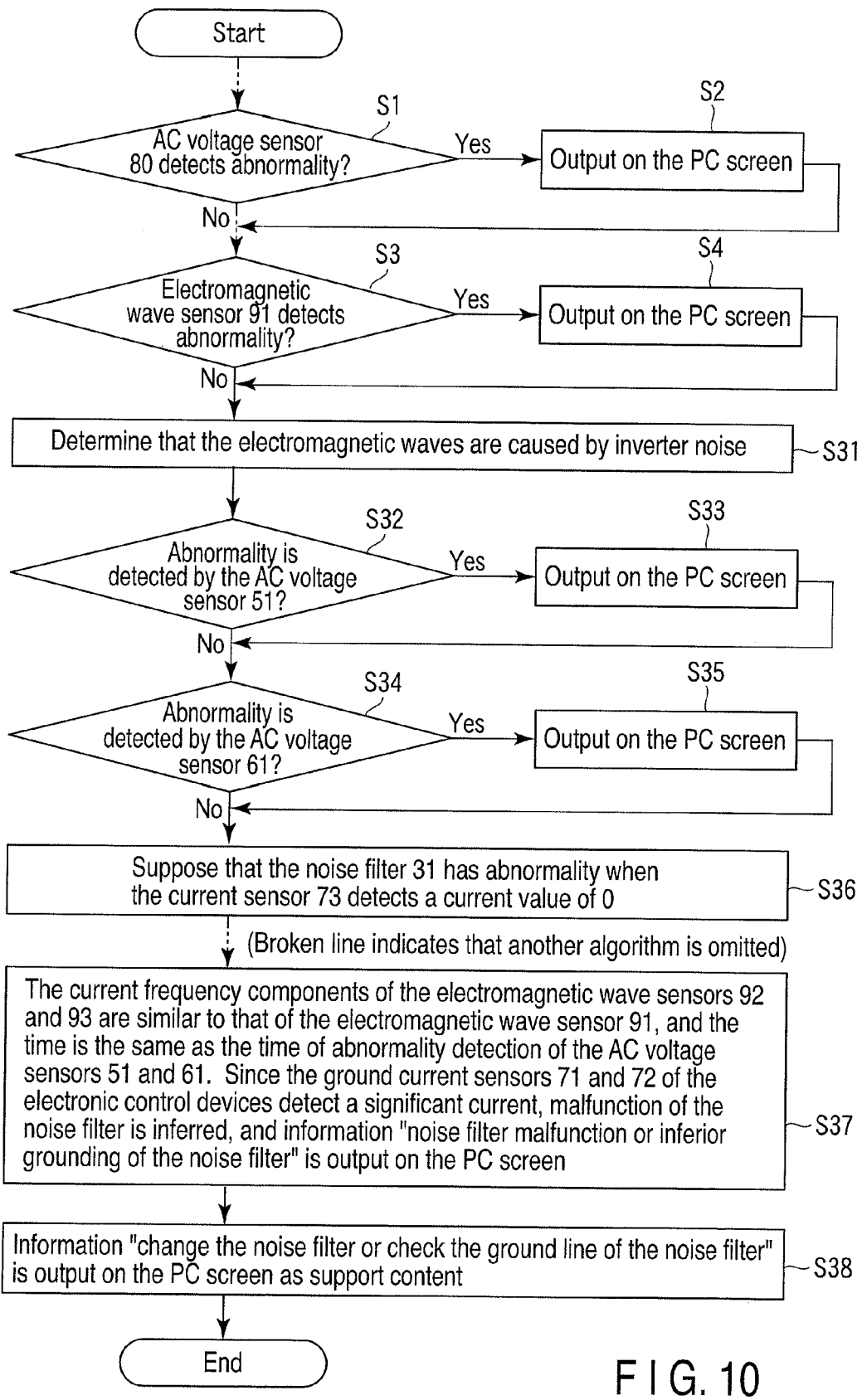
FIG. 10 is an algorithm diagram for supporting a measure in Embodiment 6 of the remote monitoring apparatus of the present invention.

FIG. 10 illustrates an example of algorithm obtained by adding the following algorithm to FIG. 8, to support the measure against the cause illustrated in FIG. 8. In the algorithm of FIG. 10, the information "change the noise filter or check the ground line of the noise filter" is output on the PC screen as support content (S38). In addition, FIG. 11 illustrates an example of algorithm obtained by adding the following algorithm to FIG. 9, to support the measure against the cause illustrated in FIG. 9. In the algorithm of FIG. 11, the information "control the humidity to a proper humidity when the humidity is low, and attach a human-body ground removal device to the equipment regardless of the value of the humidity" is output on the PC screen as support content (S54).

The support contents in these examples are displayed on the basis of a knowledge base (not shown) for each inferred cause and each part including the inferred cause. The knowledge base can be realized by any method, such as an independent logic group, an independent inference engine, and direct expression on algorithm.

Embodiment 6 described above has the effect of supporting the measure against the inferred cause, as well as inferring the cause, in comparison with Embodiments 4 and 5.

EMBODIMENT 7

Embodiment 7 is explained below with reference to FIG. 12.

Figure 12:
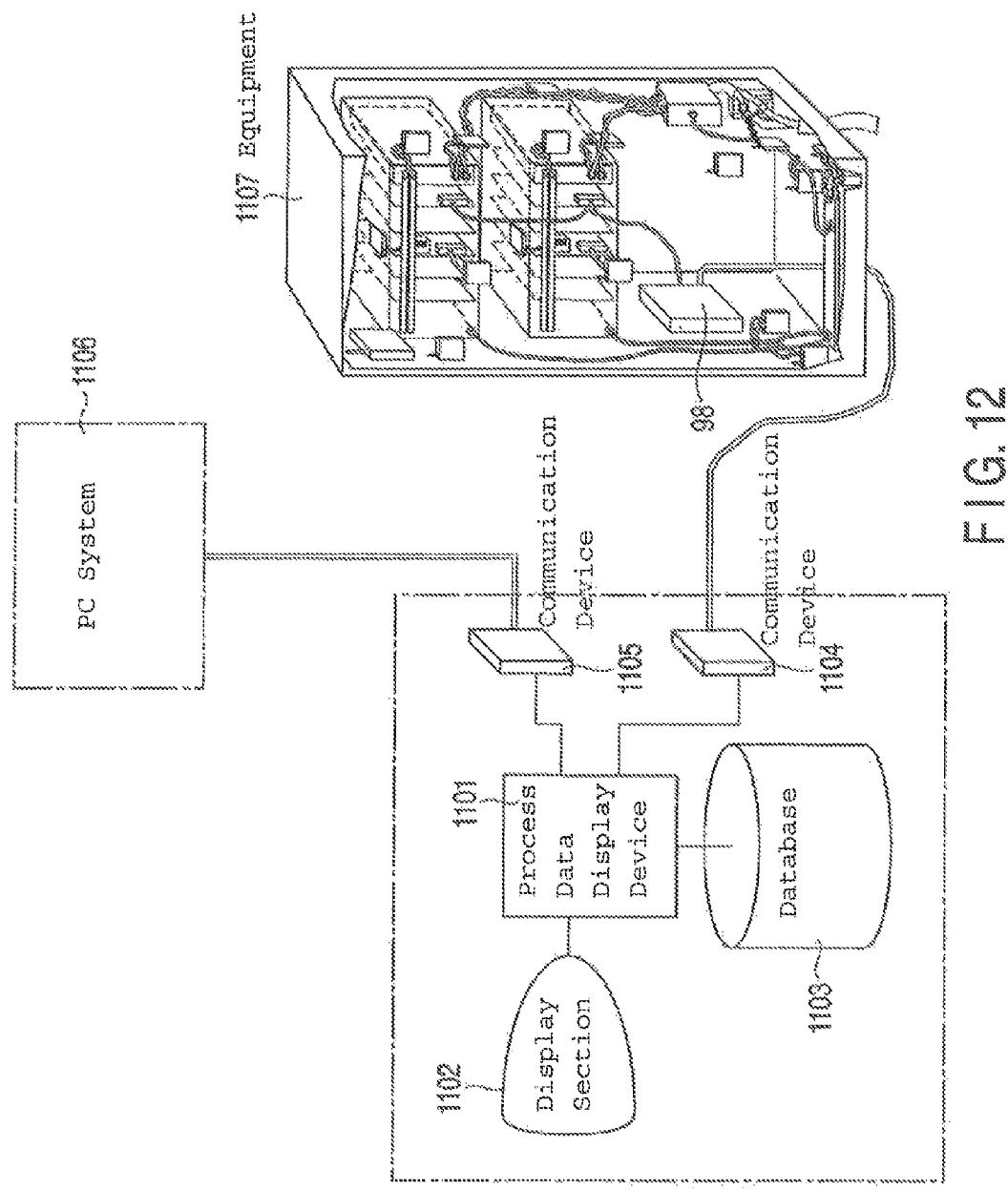
FIG. 12 is an explanatory diagram of Embodiment 7 of the remote monitoring apparatus of the present invention, and a schematic diagram of a system which simultaneously displays process data and environment information of control equipment.

In FIG. 12, reference numeral 1101 denotes a process data display device, 1102 denotes a display section, 1103 denotes a real-time data storing database, 1104 denotes a communication device for obtaining process data and control data from the equipment, 1106 denotes a PC system which collects sensor information, and infers the part including abnormality and support the measure against abnormality, as explained in Embodiments 1 to 6, and 1105 denotes a communication device which collects the sensor information and determination information from the PC.

Reference numeral 1107 denotes equipment obtained by adding a communication device 98, which transmits process data, to the equipment of FIG. 2. The other elements of the equipment 1107 are the same as those in FIG. 2, and reference numeral thereof are omitted.

Next, operation of FIG. 12 is explained.

The process data display device 1101 obtains real-time process data through the communication devices 98 and 1104 which constantly transmit process data, and stores the process data in the real-time data storing database 1103. Simultaneously, the process data display device 1101 obtains abnormal occurrence information with time and information of detection of change, although it is not abnormality, through the communication device 1105 which collects sensor information and determination information from the PC, and stores them in the database 1103.

When abnormality occurs in the process, information of process abnormality, control data, and process data are displayed as a trend graph or the like, and the information from the PC is displayed in a manner of overlapping the graph on the section 1102.

Based on the displayed information, the user judges whether the process abnormality is caused by the environment abnormality or environment change occurred in the equipment or not.

Embodiment 7 has the effect that the relation between the process abnormality and the environment of the equipment can be clarified.

What is claimed is:

1. A remote monitoring apparatus, comprising:
    a plurality of environment sensors which measure placement environment of devices provided inside control equipment as an object to be monitored, a plurality of physical sensors which measure physical quantities including voltages of the devices provided inside the control equipment as the object to be monitored, and a wireless communication system which is capable of transmitting data measured by the environment sensors and the physical sensors to outside of the control equipment; and
    a monitoring device comprising another wireless communication system which is provided in a position remote from the control equipment, and is capable of taking in the data measured by the sensors and obtained through the wireless communication system, wherein the monitoring device monitors normality of environment of the control equipment based on:
        a correlation between changes in the measured data for the placement environment and the measured data for the physical quantities including the voltages of the devices provided inside the control equipment; and
        a pre-stored knowledge base concerning environment standard;
    wherein the knowledge base is obtained by determining a degree of influence on the object to be monitored in the placement environment based on a value which agrees with both a result of an experiment performed in advance by providing environment noise to typical control equipment, the result of the experiment being expressed numerically, and a result of a simulation of propagation of the environmental noise.

2. A remote monitoring apparatus according to claim 1, wherein:
    the environment sensors are a plurality of electromagnetic wave sensors provided in different positions inside the control equipment, the physical sensors are a plurality of voltage sensors which measure a voltage of a main power supply existing inside the control equipment, and
    the monitoring device determines abnormality in the control equipment, when at least one of the following conditions is met:
        all data items measured by the electromagnetic wave sensors and all data items measured by the voltage sensors are abnormal,
        a time of abnormality of the electromagnetic sensors is close to a time of abnormality of the voltage sensors,
        current waveforms of the electromagnetic wave sensors are similar to one another,
        frequency components of the electromagnetic wave sensors are similar to one another, or
        abnormality of the voltage sensors of the control power supply is closely correlated with abnormality of the other voltage sensors.

3. A remote monitoring apparatus according to claim 1, wherein:
    the remote monitoring apparatus has a function of displaying environment information obtained by the monitoring device and time-series data of a process in a mixed state, and checking whether change obtained by the environment information or change obtained from information of the monitoring device including internal information affects on abnormality, when abnormality of process control or malfunction occurs.

* * * * *